United States Patent [19]

Diewert

[11] Patent Number: 4,782,595
[45] Date of Patent: Nov. 8, 1988

[54] BRAKE DRUM MEASURING APPARATUS

[76] Inventor: Arman Diewert, 3225 Wildwood Road, Kelowna, Canada, V1W 2S3

[21] Appl. No.: 113,021

[22] Filed: Oct. 26, 1987

[51] Int. Cl.⁴ .............................................. G01B 5/02
[52] U.S. Cl. ................... 33/147 J; 33/178 R; 33/610
[58] Field of Search ............. 33/147 R, 147 H, 147 I, 33/147 J, 147 K, 147 F, 609, 610, 168 R, 143 M, 143 R, 143 D, 143 G, 158, 161, 203.21

[56] References Cited

U.S. PATENT DOCUMENTS

| | | | |
|---|---|---|---|
| 69,953 | 10/1867 | Richards | 33/168 R |
| 1,491,100 | 4/1924 | Hoke | 33/168 R |
| 2,648,134 | 8/1953 | Billeter | 33/147 T |
| 2,957,247 | 10/1960 | Brown | 33/147 F |
| 3,006,076 | 10/1961 | Wisti | 33/147 T |
| 3,381,385 | 5/1968 | Wilber | 33/168 R |
| 3,745,661 | 7/1973 | Atzberger | 33/147 J |

FOREIGN PATENT DOCUMENTS 933784  1/1948  France .................................. 33/158

Primary Examiner—Harry N. Haroian
Attorney, Agent, or Firm—Townsend & Townsend

[57] ABSTRACT

A brake drum measuring apparatus. There is a receiving bracket having a main portion with a longitudinal cavity and a distal, depending portion for mounting a pin to abut against the inner circumference of a brake drum. A guage member is slidably received within the longitudinal cavity of the receiving bracket, and has a main portion with a coarse measuring scale, an actuating means for operating a fine measuring scale and a distal depending portion for mounting a pin to abut against the inner circumference of a brake drum. There is a lock for fixing the position of the guage member in the longitudinal cavity of the receiving bracket. A fine measuring scale is mounted on the receiving bracket and cooperates with the actuator of the guage member as the guage member slides in the longitudinal cavity. A pointer is mounted on the receiving bracket to point to the coarse measuring scale.

8 Claims, 2 Drawing Sheets

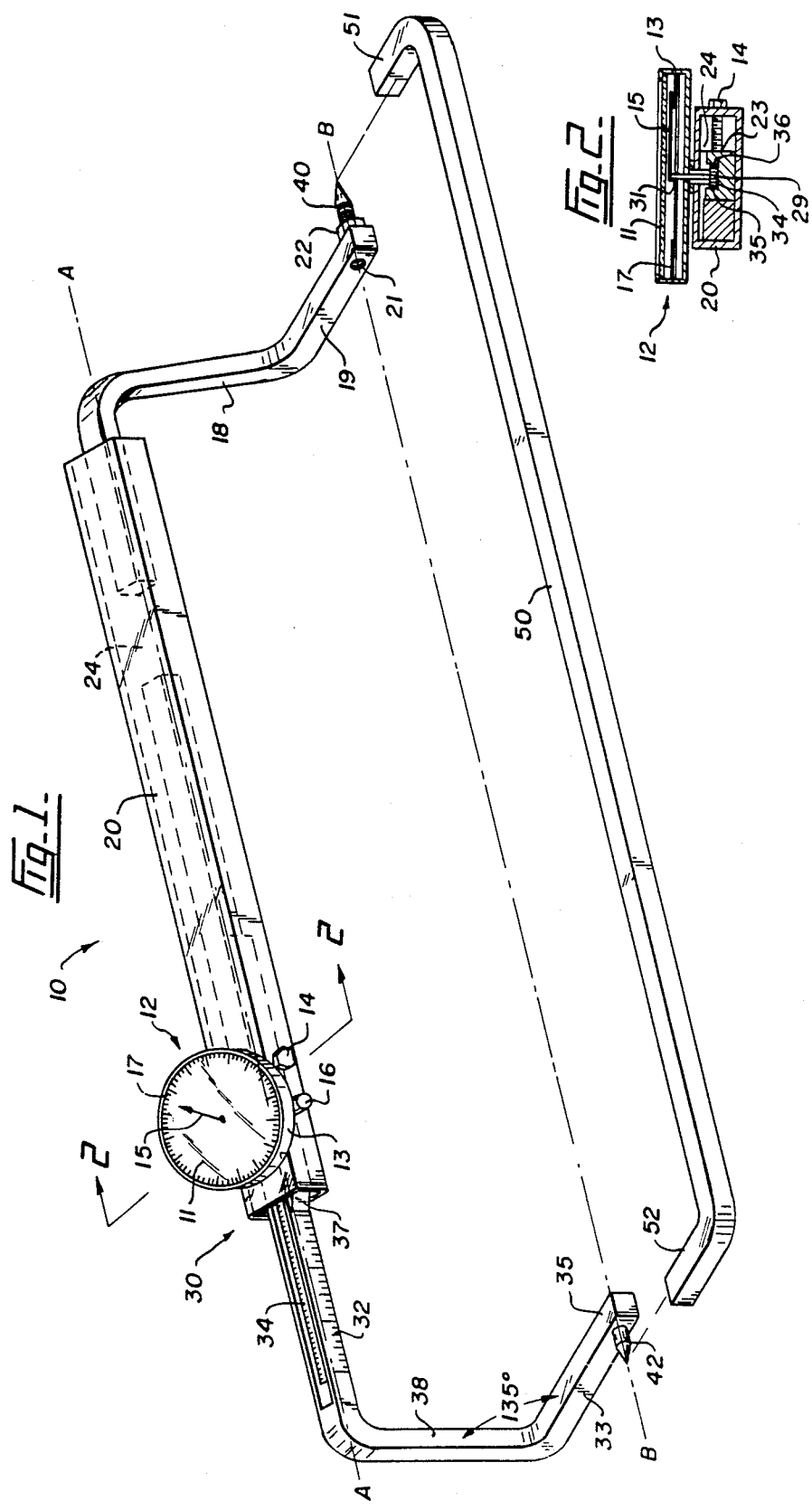

BRAKE DRUM MEASURING APPARATUS

FIELD OF THE INVENTION

This invention relates to a brake drum measuring apparatus.

Periodically it is necessary to check the wear of vehicle brake drums to determine if the drums are within a prescribed tolerance range. This tolerance range, set by the manufacturer, ensures that the brake drums are still within a certain internal diameter and, secondly, either perfectly round or vary from perfectly round by a tolerable amount.

If a brake drum's internal diameter does not fall within the prescribed ranges then the drum may be machined or, if the internal diameter is too large, must be replaced.

DESCRIPTION OF THE PRIOR ART

Brake drum measuring apparatus are used to measure the internal diameters of brake drums to see whether the drums meet the manufacturer's specification.

Prior art known to applicant includes U.S. Pat. Nos. 4,520,568 to Drenner; 3,827,153 to Mitchell; 3,190,006 to Madeira; 3,192,634 to Johnson; 2,769,241 to Barrett and 3,197,874 to Fox. Of the above Drenner discloses a brake drum guage with a flat, U-shaped frame and micometer. The apparatus in Drenner depends on a reference pin and different sizes of brake shoes can be measured by using different lengths of reference pins and corresponding supports for that pin.

Mitchell discloses a device whose principal function is to allow the clearance between brake drums and shoes to be accurately set.

Madeira teaches a brake drum gauge composed of two sections that slidably engage each other.

Johnson shows a dimensional gauge for large diameters. The apparatus in Johnson includes gauging rolls inserted between the surfaces to be measured.

Barrett is a brake gauge has a coarse measuring gauge imprinted on a guide. A body 6 is slidably received on the guide and a mechanically operated micrometer with a scale and needle is operated through a series of gears.

Fox teaches a marking gauge includes a measuring instrument with an adjustable slide bar.

Of the above it is believed that Barrett is the most pertinent.

SUMMARY OF THE INVENTION

The present invention seeks to provide an accurate and convenient, lightweight apparatus to measure the internal diameter of a brake drum. It is a particular feature of the present invention that the apparatus can be used while the brake drum is in place on the vehicle and greatly facilitates the use of such brake measuring apparatus compared with the prior art.

Accordingly, the present invention is a brake drum measuring apparatus comprising a receiving bracket having a main portion with a longitudinal cavity and a distal, depending portion for mounting a pin to abut against the inner circumference of a brake drum; a guage member slidably received within the longitudinal cavity of the receiving bracket, having a main portion with a coarse measuring scale, an actuating means for operating a fine measuring scale, a distal depending portion for mounting a pin to abut against the inner circumference of a brake drum; locking means for fixing the position of the guage member in the longitudinal cavity of the receiving bracket; fine measuring scale means mounted on said receiving bracket cooperating with said actuating means of said guage member as the guage member slides in the longitudinal cavity; a pointer mounted on said receiving bracket to point to the coarse measuring scale.

BRIEF DESCRIPTION OF THE DRAWINGS

Aspects of the invention are illustrated, merely by way of example, in the accompanying drawings in which:

FIG. 1 is an isometric projection of an apparatus of the present invention;

FIG. 2 is a section 2—2 in FIG. 1;

DESCRIPTION OF THE PREFERRED EMBODIMENTS

Figure 3:
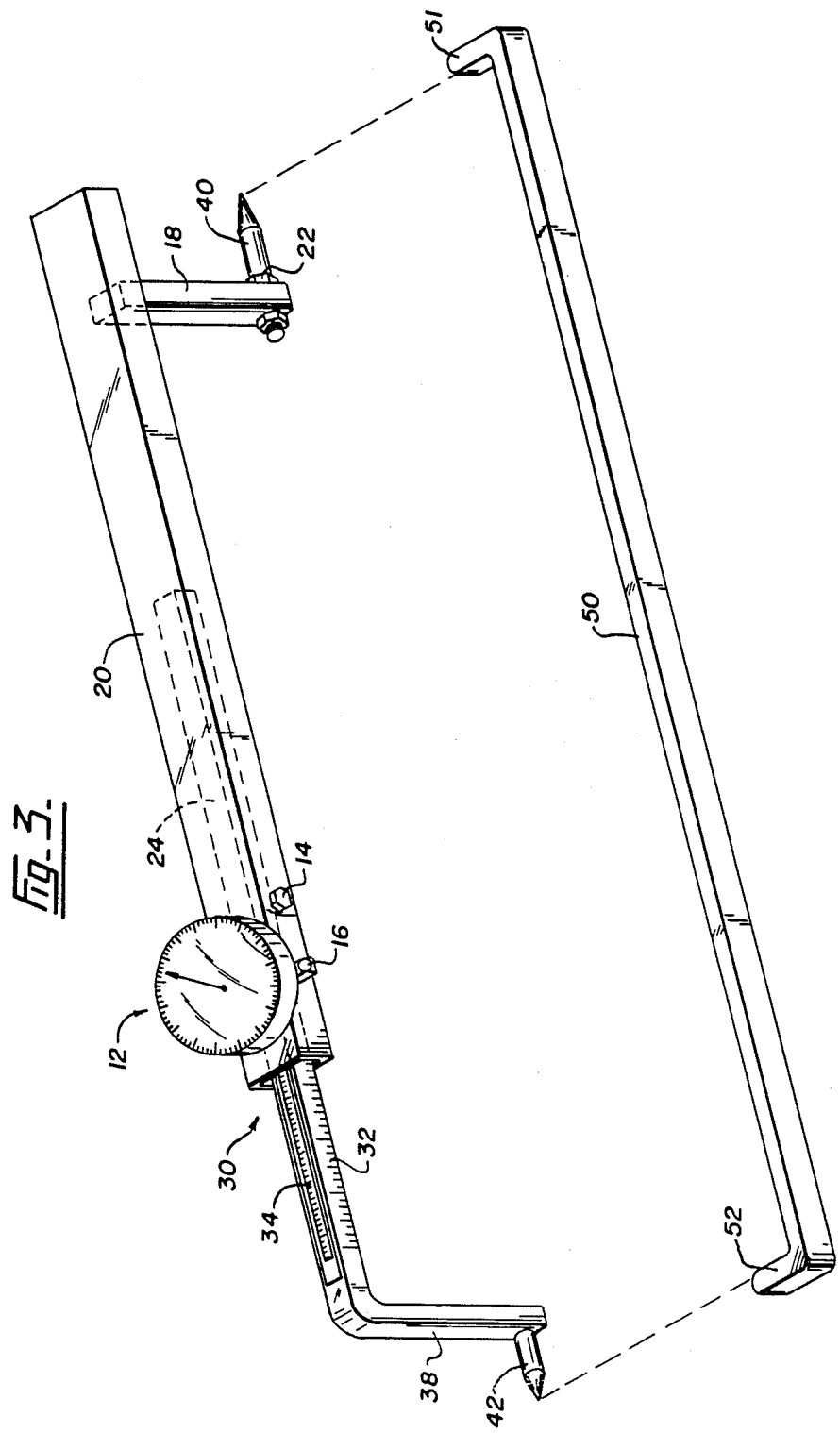
FIG. 3 is an isometric view similar to FIG. 1, of a further embodiment of the invention.

FIG. 1 shows a preferred embodiment of the present invention suitable for measuring larger diameter brake drums without removal of the wheel. The apparatus 10 comprises an essentially inverted U-shaped structure formed from a receiving bracket 20 and gauge member 30. The main portion 30 of the gauge member is slidably received within cavity 24 of the main portion of the receiving bracket 20. At its opposite end, gauge member 30 is bent downwardly through about 90° from the horizontal axes of the gauge members main portion to form descending arm 38 which, in turn, is bent upwardly out of the vertical plane of the inverted U-shape to form arm 33 at an angle of 135° to the side face of descending arm 38. Pin 42 is mounted towards the free end 35 of arm 33 to abut against the internal circumferential surface of a brake drum.

At that end of the horizontal portion of the receiving bracket 20 opposite the entry point for gauge member 30, is a second angle arm affixed in any suitable manner to the main portion of the receiving bracket 20 and shaped to present a mirror image of the angle arm formed from gauge member 30. Descending arm 18 is bent into arm 19 with threaded hole 21 drilled through it. An adjustable pin 40 with a corresponding threaded outer circumference is threadably received in hole 21. It can be secured in place using lock nut 22. Pins 40 and 42 are coaxial with and at opposite ends of horizontal axis B—B which is in turn is parallel to horizontal axis A—A allowing coarse scale 32 on axis A—A to be used to indicate the distance between the ends of pins 42 and 40 on axis B—B. Receiving bracket 20 has a horizontal portion with an enlarged cross section and central cavity 24 to house gauge member 30. Receiving bracket 20 and internal cavity 24 are of sufficient length to fully accept the horizontal portion of gauge member 30. Coarse scale 32 inscribed on one surface of gauge member 30. Scale 32 is is positioned on gauge member 30 such that pointer 37, mounted to receiving bracket 20, always indicates the distance between the ends of pins 42 and 40. To obtain a more accurate measure of the distance between pins 40 and 42 than coarse scale 32 can provide, dial gauge 12 is provided to act as a vernier gauge. Dial gauge 12 comprises a housing 13 with a centrally mounted, rotating ponter 15 and circular scale 17 contained therein, beneath a transparent cover 11. Dial gauge 12 operates such that each time pointer 37 moves between any adjacent markings on coarse scale 32, rotating pointer 15 describes one full revolution of circular scale 17 and, in doing so, rotating pointer 15, divides the distance between adjacent markings on coarse scale 32 into smaller units as indicated on circular scale 17 of dial gauge 12.

Dial gauge 12 performs its vernier scale function using a rack and pinion system to drive a rotating pointer 15. Rack 34 extends the horizontal length of gauge member 30 with serrated inner edges 35 and 36. Geared drive wheel 29 held in rack 34, is connected through a shaft 31 and a series of gear (not shown) to rotating pointer 15. Dial gauge 12 is mounted atop receiving bracket 20 and shaft 31 extends through an opening in receiving bracket 20 to communicate with geared drive wheel 29 in rack 34. As gauge member 30 is moved back and forth in cavity 24 of receiving bracket 20, geared drive wheel 29 rotates due to the horizontal motion of rack 34. This rotary motion is transmitted through shaft 31 and an appropriate gear system to move rotating pointer 15 an appropriate distance relative to circular scale 17 of dial gauge 12 to indicate the small horizontal distance travelled by rack 34.

Dial gauge 12 is also equipped with lock button 16. When depresed this button 16 locks the dial gauge in position.

Locking screw 14 extends through the side wall of receving bracket 20 and can be used to lock gauge member 30 in place relative to receving bracket 20. By rotating the screw inwardly until gauge member 30 is clamped between the ends 23 of the locking screw 14 and the opposite wall of cavity 24, the appropriate locking is achieved.

The present invention also includes a calibration bar 50 of a predetermined length between its two end tabs 51 and 52. In order to calibrate the present invetnion, the gauge member 30 is positioned in receving bracket 20 such that pointer 37 of coarse scale 32 and rotating pointer 15 of dial gauge 12 indicates the known length of the calibration bar. Pins 40 and 42 are inserted between end tabs 51 and 52 of calibration bar 50. If necessary, adjustable pin 40 can be moved inwardly or outwardly, after loosening lock nut 22, to ensure that pins 40 and 42 span a distance equal to that indicated by the calibration of the coarse scale and dial gauge.

The first embodiment of the invention can be used while the brake drums are still in place on the vehicle. After removing the brake drum inspection plate, the U-shape of the apparatus of the present invention allows it to fit around the vehicle's axles and the descending arms are formed so as to allow pins 40 and 42 to be inserted into the interior of the brake drum. Inside the brake drum pins 40 and 42 abut against the internal braking surface of the drum. Coarse gauge 32 and dial gauge 12 in combination give an accurate measurement of the internal diameter of the brake drum.

Thus brake drum wear can be instantly determined to see whether the internal diameter is still within a predetermined range fixed by the manufacturer. If not, replacement of the brake drum is necessary.

The embodiment of FIG. 3 is for use with smaller brake drums. In FIG. 3, where appropriate, the same reference numerals are used where the item is also described in FIG. 1. In the embodiment of FIG. 3 descending arms 38 and 18, to which pins 40 and 42 are mounted, are mounted vertically beneath horizontal axes of gauge member 30 and receiving bracket 20.

In using the embodiment of FIG. 3 of the present invention the brake drum to be inspected is first removed from the vehicle. Arms 38 and 18 are inserted into the brake drum and pins 40 and 42 brought into contact with the drums internal braking surface. The drum's internal diameter can be read from the coarse scale 32 and dial gauge 12, to determine whether the drums are within manufacturer's tolerance.

I claim:

1. A brake drum measuring apparatus comprising:
   a receiving bracket having a main portion with a longitudinal cavity and a distal depending portion for mounting a pin to abut against the inner circumference of a brake drum;
   a gauge member slidably received within the longitudinal cavity of the receiving bracket, having a main portion with a coarse measuring scale, an actuating means for operating a fine measuring scale, a distal depending portion for mounting a pin to abut against the inner circumference of a brake drum;
   locking means for fixing the position of the gauge member in the longitudinal cavity of the receiving bracket.
   fine measuring scale means mounted on said receiving bracket cooperating with said actuating means of said gauge member in the longitudinal cavity; and
   a pointer mounted on said receiving bracket to point to the coarse measuring scale,
   said distal depending portions of said receiving bracket and said gauge member comprising coplanar first portions extending from said main portions in an essentially vertical plane, said first portions being bent to form coplanar second portions extending out of said vertical plane, each of said second portions providing a mounting location for one of said pins, said pins defining an axis that is parallel to the longitudinal cavity of said receiving bracket.

2. Apparatus as claimed in claim 1 in which the pin attached to the depending portion of the receiving bracket is adjustably mounted.

3. Apparatus as claimed in claim 1 in which said locking means comprises a screw threaded through said receiving bracket into the longitudinal cavity so as to clamp the slidable gauge member in the longitudinal cavity between the opposite wall of said longitudinal cavity and said screw end when the screw is threaded inwardly.

4. Apparatus as claimed in claim 1 in which the apparatus is adjustable to measure a minimum brake drum diameter of 14" and a maximum diameter of 20¼".

5. Apparatus as claimed in claim 1 including calibration means for the apparatus.

6. Apparatus as claimed in claim 5 in which the calibration means comprises a rod of known length with stop tabs at opposite ends whereby the coarse measuring scale and the fine measuring scale means are set to indicate a distance equal to the known length of the rod and the pin of said brake drum measuring apparatus are inserted between the stop tabs and the adjustable pin is adjusted until it abuts against one of said stop tabs.

7. Apparatus as claimed in claim 1 in which the actuating means operating the fine measuring scale means is a rack.

8. Apparatus as claimed in claim 1 in which the fine measuring scale comprises a dial gauge.

* * * * *